United States Patent
Zeno et al.

(10) Patent No.: US 8,839,534 B2
(45) Date of Patent: Sep. 23, 2014

(54) MONOLITHIC FLOOR FOR HOT SLAG BUCKET

(75) Inventors: Joseph R. Zeno, Akron, OH (US); Robert J. Willoughby, Munroe Falls, OH (US)

(73) Assignee: ACS Industries, Inc., Kent, OH (US)

( * ) Notice: Subject to any disclaimer, the term of this patent is extended or adjusted under 35 U.S.C. 154(b) by 262 days.

(21) Appl. No.: 13/193,219

(22) Filed: Jul. 28, 2011

(65) Prior Publication Data

US 2012/0030147 A1 Feb. 2, 2012

Related U.S. Application Data

(60) Provisional application No. 61/368,524, filed on Jul. 28, 2010.

(51) Int. Cl.
*E02F 3/36* (2006.01)
*E02F 3/40* (2006.01)

(52) U.S. Cl.
CPC .......................... *E02F 3/40* (2013.01)
USPC ............................. 37/446; 414/722

(58) Field of Classification Search
USPC ............ 37/379, 411, 444, 903, 446; 414/379, 414/394, 487, 656, 685, 705, 711, 722
See application file for complete search history.

(56) References Cited

U.S. PATENT DOCUMENTS

| | | | | |
|---|---|---|---|---|
| 2,461,653 A * | 2/1949 | Nadherny | ..................... | 414/685 |
| 2,714,459 A * | 8/1955 | Hay | ............................... | 414/565 |
| 2,843,213 A * | 7/1958 | Schwartz | ..................... | 180/53.1 |
| 3,096,893 A * | 7/1963 | Biedess | ......................... | 414/565 |
| 3,254,781 A * | 6/1966 | Zink | ............................. | 414/487 |
| 3,343,693 A * | 9/1967 | Becker | ......................... | 414/694 |
| 3,356,240 A * | 12/1967 | Zink | ............................. | 414/487 |
| 3,520,432 A * | 7/1970 | Henriksson et al. | ......... | 414/487 |
| 3,521,783 A * | 7/1970 | McAdams | .................... | 414/717 |
| 3,773,196 A * | 11/1973 | Shepherd | ......................... | 37/444 |
| 3,853,232 A * | 12/1974 | Oke et al. | ........................ | 37/446 |
| 3,860,131 A * | 1/1975 | Borowski et al. | ............ | 414/697 |
| 4,080,746 A * | 3/1978 | Frazzini | ......................... | 37/403 |
| 4,081,919 A * | 4/1978 | Teach | ............................. | 37/444 |
| 4,129,952 A * | 12/1978 | Olson | ............................. | 37/444 |
| 4,306,832 A * | 12/1981 | Schmiesing | ................. | 414/718 |
| 4,505,632 A * | 3/1985 | Quenzi | ........................ | 414/510 |
| 4,854,811 A * | 8/1989 | Veys | ............................. | 414/718 |
| 4,890,400 A * | 1/1990 | Long | ............................. | 37/241 |
| D308,528 S * | 6/1990 | Harr | ............................. | D15/32 |
| 4,999,022 A * | 3/1991 | Veys | ............................. | 414/718 |
| 5,020,249 A * | 6/1991 | Matthews | ....................... | 37/444 |
| 5,564,885 A * | 10/1996 | Staben, Jr. | .................... | 414/724 |
| 6,186,735 B1 * | 2/2001 | Deyo et al. | ..................... | 414/722 |
| 6,230,424 B1 * | 5/2001 | Renski et al. | .................. | 37/446 |
| 6,360,459 B1 * | 3/2002 | Brookhart et al. | ............. | 37/442 |
| 6,363,633 B1 * | 4/2002 | Holzer et al. | .................. | 37/446 |
| 6,374,520 B1 * | 4/2002 | Westendorf et al. | ........... | 37/444 |
| 6,435,800 B2 * | 8/2002 | Fetzer | .......................... | 414/420 |
| 6,457,268 B1 * | 10/2002 | Perry et al. | ..................... | 37/403 |
| 6,486,787 B2 * | 11/2002 | Rieger et al. | .................. | 340/685 |

(Continued)

*Primary Examiner* — Gregory Adams
*Assistant Examiner* — Brendan Tighe
(74) *Attorney, Agent, or Firm* — Zollinger & Burleson Ltd.

(57) ABSTRACT

The disclosure provides a monolithic floor for use with a hot slag bucket. The monolithic floor improves the lifespan of the bucket when used with hot slag by reducing warpage caused by heating and cooling and thus significantly reduces the cost of owning and operating the hot slag bucket.

5 Claims, 8 Drawing Sheets

(56) References Cited

U.S. PATENT DOCUMENTS

| | | | |
|---|---|---|---|
| 6,733,056 B2 * | 5/2004 | Daniele | 294/212 |
| 6,846,152 B2 * | 1/2005 | Mikrut et al. | 414/700 |
| 7,036,247 B1 * | 5/2006 | Frazee et al. | 37/270 |
| 7,162,817 B2 * | 1/2007 | Stock | 37/408 |
| 7,214,026 B2 * | 5/2007 | Hilvers et al. | 414/685 |
| D551,684 S * | 9/2007 | McClallen et al. | D15/32 |
| 7,377,955 B1 * | 5/2008 | Shaw et al. | 75/414 |
| 7,484,321 B1 * | 2/2009 | Stafne, Sr. | 37/227 |
| D616,469 S * | 5/2010 | Ballinger et al. | D15/32 |
| 7,712,234 B2 * | 5/2010 | Striegel | 37/444 |
| 7,793,443 B2 * | 9/2010 | Galbreath | 37/444 |
| 7,992,328 B2 * | 8/2011 | Striegel | 37/444 |
| 2007/0031233 A1 * | 2/2007 | Frey | 414/685 |
| 2013/0084155 A1 * | 4/2013 | Hodges et al. | 414/696 |

\* cited by examiner

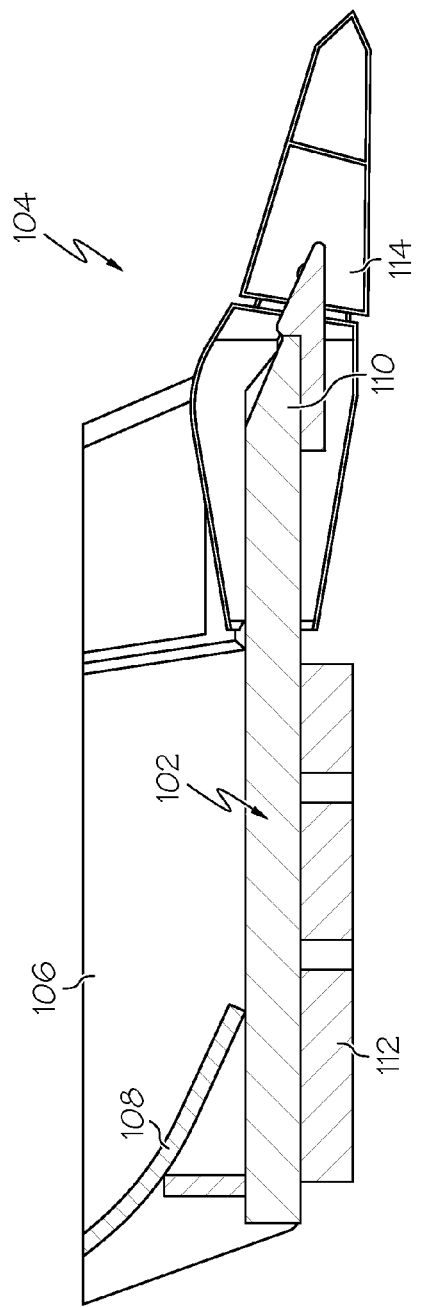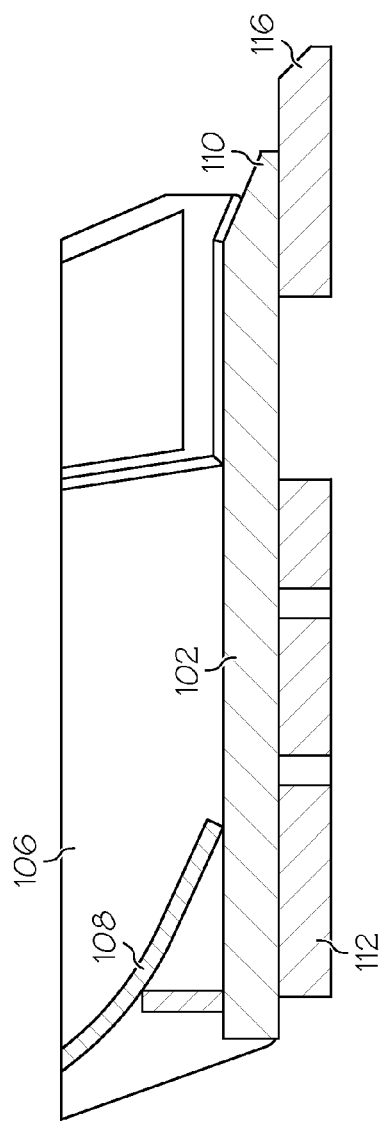

MONOLITHIC FLOOR FOR HOT SLAG BUCKET

CROSS REFERENCE TO RELATED APPLICATIONS

This application claims the benefit of U.S. provisional application Ser. No. 61/368,524 filed Jul. 28, 2010; the disclosures of which are incorporated herein by reference.

BACKGROUND OF THE INVENTION

1. Technical Field

The present disclosure generally relates to severe duty buckets used with industrial equipment and, more particularly, to floors used with loader buckets used to move hot slag or other extreme materials. Specifically, the disclosure relates to the structure of a flat, monolithic floor for a hot slag bucket, hot slag or extreme buckets using the floors, and methods for retrofitting older hot slag or extreme buckets.

2. Background Information

Slag is a byproduct of both ferrous and nonferrous ore smelting operations. Slag is used for various industrial and commercial purposes. To process slag, it must be moved from place to place while the slag is extremely hot. The hot slag is moved with industrial mobile material handling equipment in many instances using a hot slag bucket. Although there have been ongoing attempts to design and build or retrofit buckets to operate in harsh or high-temperature conditions, repeated operations in a hot slag environment subjects the buckets to cyclical heating and cooling. Current-design slag buckets quickly warp and become so misshapen that they become ineffective for the purposes intended and repair or rebuild of the bucket during the bucket's useful life is often required. These conditions are disruptive to the work effort and expensive to complete. In response to the cyclical heating and cooling caused by the handling of hot slag, the bottoms of most bucket floors will warp to a degree where the bucket must be removed from use and either refurbished or scrapped altogether which significantly increases disruptions to production and increases costs to the owner. The severe warping is believed to be caused by the cyclical heating and cooling of the bucket floor/edge combination that is made from at least two pieces of different-thickness material and/or materials that are different in composition and joined together with a weld joint. These different elements heat and cool and expand and contract differentially to the high heat from the hot slag and eventually render the bucket useless.

An exemplary prior art flat-bottomed slag bucket is indicated generally by the numeral 2 in FIG. 1. Bucket 2 generally includes a floor assembly 4, a pair of side plates 6, and a wrapper 8. Floor assembly 4 includes a rectangular floor portion 10 having a bottom surface. An edge 12 is welded directly to the front of floor portion 10 to form floor assembly 4. Edge 12 may be provided in different configurations such as the straight edge depicted in FIG. 1 and others such as modified spade edges. A typical floor portion 10 may be one inch thick while edge 12 may be provided in a two inch thickness. The different thicknesses of floor assembly 4 contribute to the uneven heating/cooling of floor assembly 4 which leads to the undesirable warping. The continuous weld joint 14 that connects edge 12 to floor portion 10 also heats at a rate that is different from floor portion 10 and edge 12 which also contributes to the stresses heat imparts to materials. The undesirable warping occurs as materials expand and contract at different rates when subjected to the heating and cooling cycles and the stresses that are induced into the materials as a result. When the purchase cost, maintenance costs, and rebuild costs are considered, bucket 2 currently costs as much as $60 per hour of use over its expected life when bucket 2 is used with hot slag operations. Expected bucket life is also impaired.

Spaced skid plates may be welded to the bottom surface of floor portion 10 where they are positioned behind base edge 12. FIG. 4 shows the different thicknesses for floor portion 10 and edge 12. The existence of the long weld 14 that connects edge 12 to floor portion 10 and the different thicknesses of edge 12 and floor portion 10 or different material composition contribute to the significant warping when bucket 2 is subjected to differential cyclical expansion and contraction experienced when bucket 2 is used with hot slag.

Those who manufacture, own and use hot slag buckets have attempted solutions in the past but have not been able to resolve the warping caused by differential heating and cooling or significantly reduce the operating cost of the bucket with their attempts. One exemplary failed attempt is depicted in FIG. 5 where a series of spaced thick and thin curved reinforcing ribs (or gargoyles as these are known in the art) are welded to the inside of the bucket. The gargoyles are added with the expectation that they will reinforce and stiffen the floor of the bucket and prevent warping. These efforts have failed. FIG. 5 depicts an example of how the gargoyles were ineffective at solving the warping problem. The bucket floor is warped to a degree that the middle portion of the front of the bucket is raised significantly above the front corners. Hot slag buckets with added gargoyles such as the examples shown in FIG. 5 have been found to warp well before the end of the expected life of the bucket thus rendering the bucket unfit for its intended purpose. The warping significantly raises the cost of owning and operating a hot slag bucket and the industry desires a solution.

SUMMARY OF THE DISCLOSURE

The disclosure provides a monolithic floor for use with a hot slag or extreme bucket. The monolithic floor improves the lifespan of the bucket when used with hot slag or extreme materials by reducing warpage caused by heating and cooling and thus significantly reducing the cost of owning and operating the hot slag bucket. The monolithic floor is fabricated from a single piece of substantially uniform material.

In one configuration, the disclosure provides a monolithic floor for a hot slag bucket wherein the monolithic floor is a constant thickness and uniform material composition. The floor may be twice as thick as the floor portions of the prior art buckets such that the floor acts as a heat sink. The floor and edge combination is provided as a single monolithic piece of material that does not include welds and weld joints that contribute to undesired warping.

The disclosure also provides a method of supplying hot slag buckets to end users where the hot slag buckets having the monolithic floors are leased to the end user with the owner of the buckets remaining responsible for the maintenance of the buckets. The buckets may be manufactured with the monolithic floor or existing buckets may be retrofit with a monolithic floor. The monolithic floor materially reduces operating costs and increases the useful life of the buckets between rebuilds such that the owner is able to confidently lease the buckets to the end users. The end users benefit by knowing the total fixed cost per hour of using the hot slag buckets without the inconvenience of added repair and maintenance expenses.

The disclosure also provides a method for retrofitting an existing bucket used in a hot slag or extreme application by replacing a warped two-piece floor with a monolithic floor.

BRIEF DESCRIPTION OF THE DRAWINGS

FIG. 10 is a section view of the monolithic floor used with skid pads and teeth.

FIG. 11 is a section view of the monolithic floor used with skid pads and a weld on edge.

Similar numbers refer to similar parts throughout the specification.

DETAILED DESCRIPTION OF THE DISCLOSURE

An exemplary monolithic floor is indicated generally by the numeral 102 in the accompanying drawings. Monolithic floor 102 may be added to a new bucket or retrofit into an existing bucket to form an improved monolithic floor bucket 104 for use with hot slag or extreme materials. Monolithic floor 102 may be provided in a wide variety of sizes to match the capacity of bucket 104 and its intending prime mover. The exemplary monolithic floor 102 is flat, has a substantially constant thickness, and is fabricated from steel. Monolithic floor 102 is not formed from multiple pieces that are welded together to define the floor body. In the context of this application, the term "monolithic" is intended to refer to a body formed from a single piece of substantially uniform material such as a single sheet of steel. As such, monolithic floor 102 has the drawback of generating waste during its fabrication because portions of the raw piece of material must be removed to define a floor body with two different widths. The fabrication process also requires the steps of cutting away the unneeded portions of the raw piece of material. Although these drawbacks exist during the fabrication of monolithic floor 102, the hot slag or extreme material buckets having monolithic floors have been shown to reduce operating costs to approximately $4/hour over their expected useful lives. This is a significant and surprising result compared to the per hour cost of prior art buckets as described above. As a result of this revolutionary design discovery, fifty-eight U.S. steel mills have adopted and standardized this new design concept in a period of less than two years.

Figure 4:
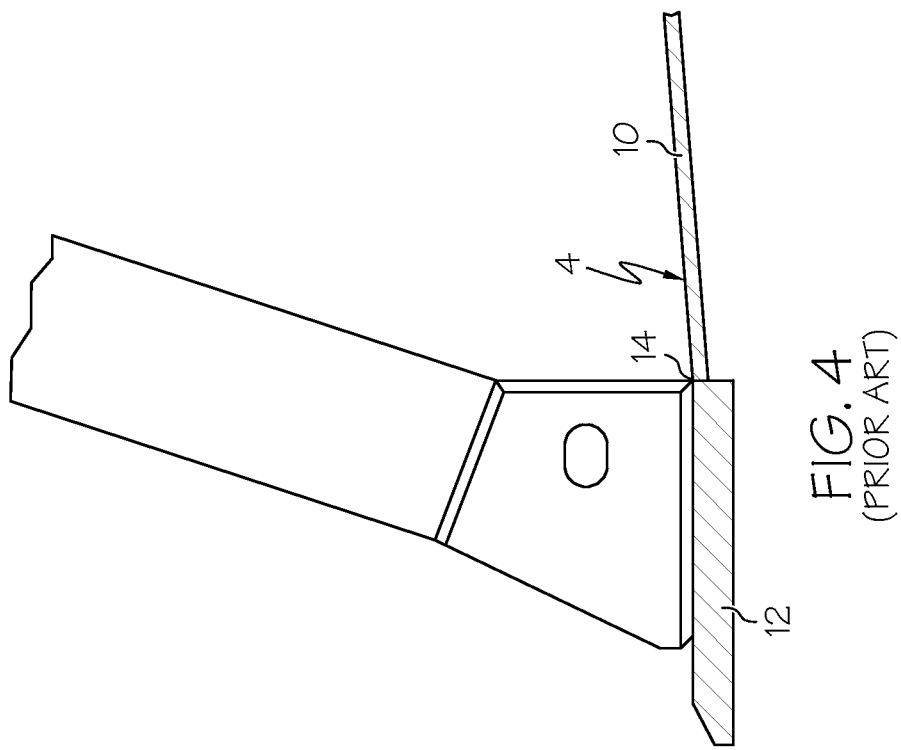
FIG. 4 is a partial detailed view of the encircled portion of FIG. 3.
Figure 3:
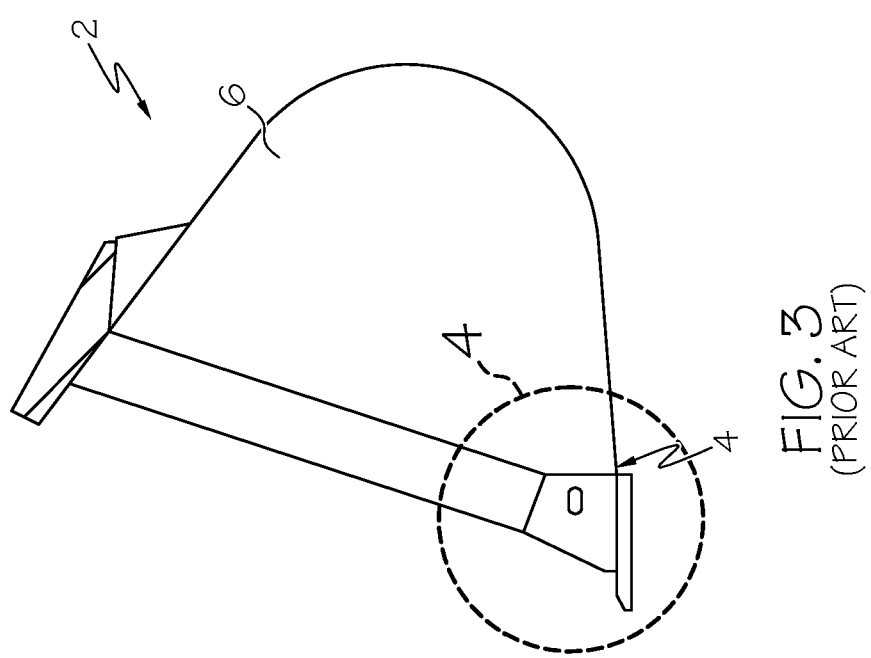
FIG. 3 is a section view taken along line 3-3 FIG. 2.
Figure 5:
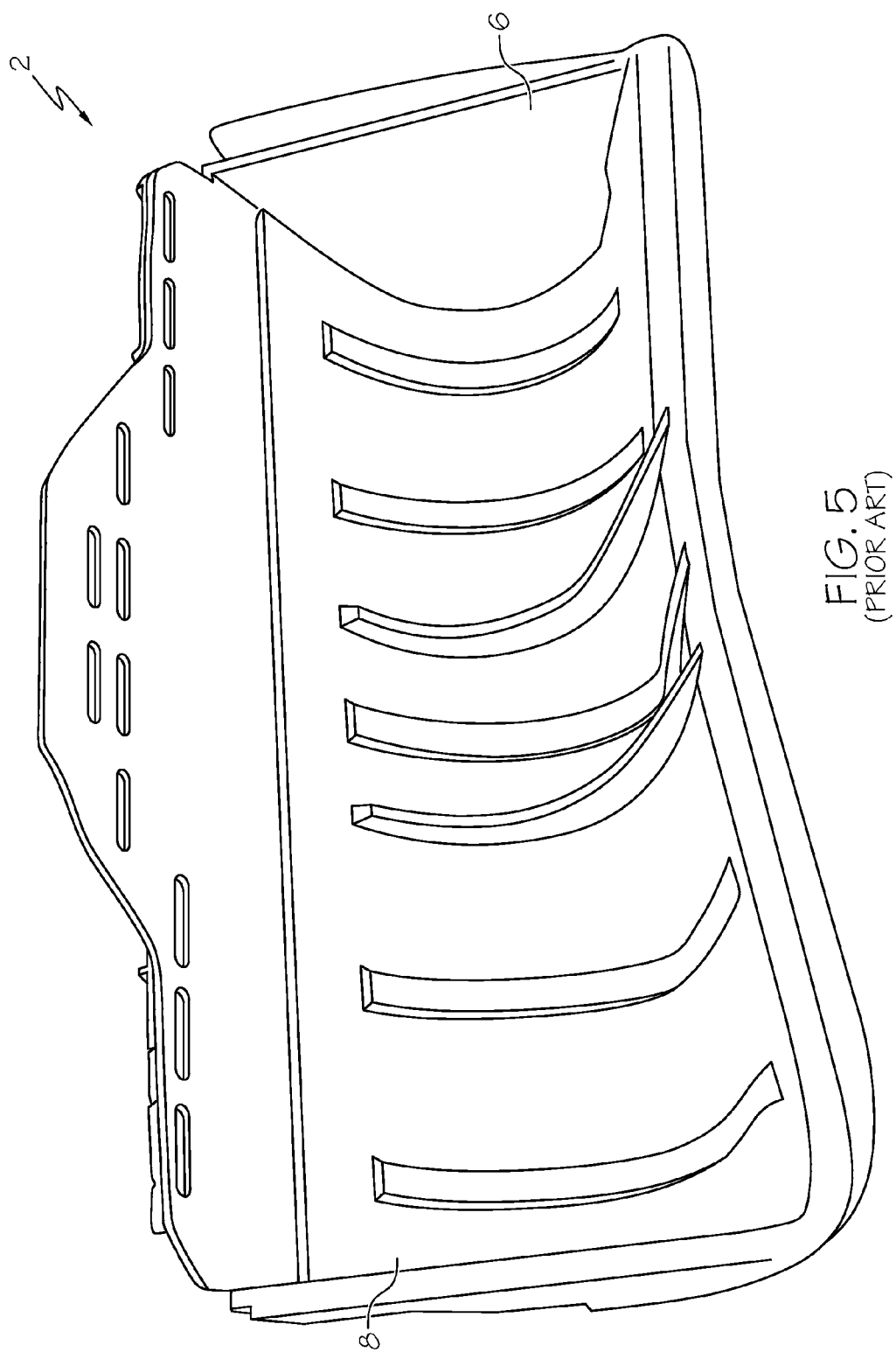
FIG. 5 is a front perspective view of an exemplary warped prior art bucket such as that shown in FIG. 1 wherein gargoyles were added to unsuccessfully limit warping.

The exemplary monolithic floor 102 resists the warping described above with respect to the prior art bucket floors. In addition to monolithic floor 102, bucket 104 generally includes a bucket core that includes at least a pair of side plates 106 and a wrapper 108. The lower front corners of side plates 106 are modified to allow the front corners of floor 102 to extend under plates 106. These modifications can be seen in FIG. 6. Although the side plates and wrapper are welded to floor 102, these welds are not considered to connect different portions of floor 102 together such that floor 102 remains free of welds. Bucket 104 is designed to be used with hot slag or other hot materials. Monolithic floor 102 is substantially thicker than floor portion 10 of the prior art bucket 2. Monolithic floor 102 functions as a heat sink when bucket 104 is used with hot slag. An exemplary floor 102 is at least one and half inches thick with many buckets using a floor that is at least two inches thick. The thickness of floor 102 will depend on the overall size of the bucket and it may be greater than the one and a half and two inch examples provided here. More specifically, the thickness of floor 102 is a calculated variable directly related to the temperature of the hot slag being handled, wear parts, the distance the hot material is hauled and the size of the prime mover upon which the bucket is pinned. Thus a small bucket working very hot slag over long distances may require a thicker monolithic floor than a larger bucket working slag that is not as hot over shorter distances. Monolithic floor 102 does not include the continuous weld between base edge 12 and floor portion 10 shown in FIG. 4. Thus there is no weld joint and no discontinuity in the thicknesses or material composition of monolithic floor 102 that contributes to undesirable warping.

Figure 6:
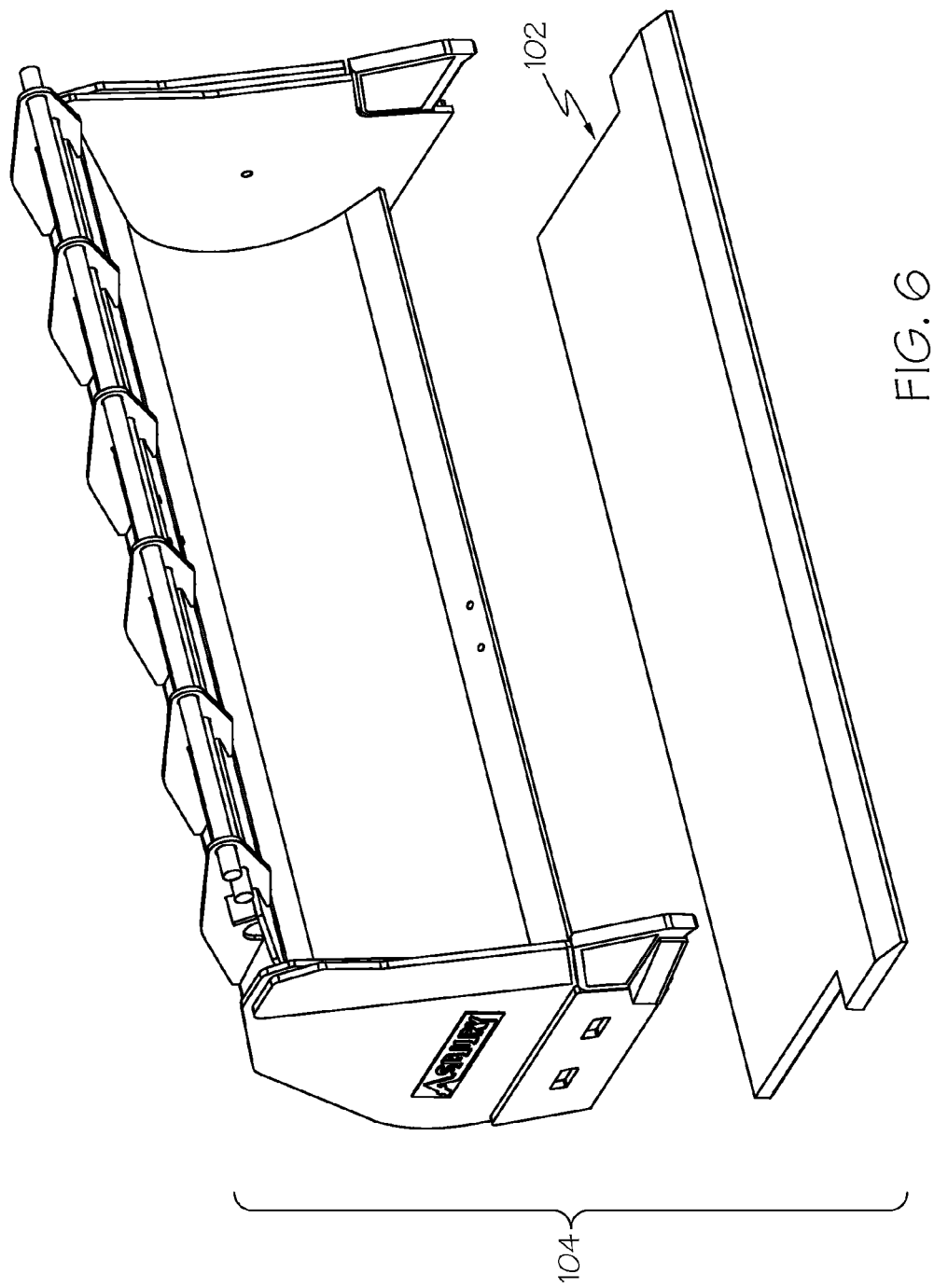
FIG. 6 is an exploded view of a hot slag buck and monolithic floor having a straight edge.
Figure 7:
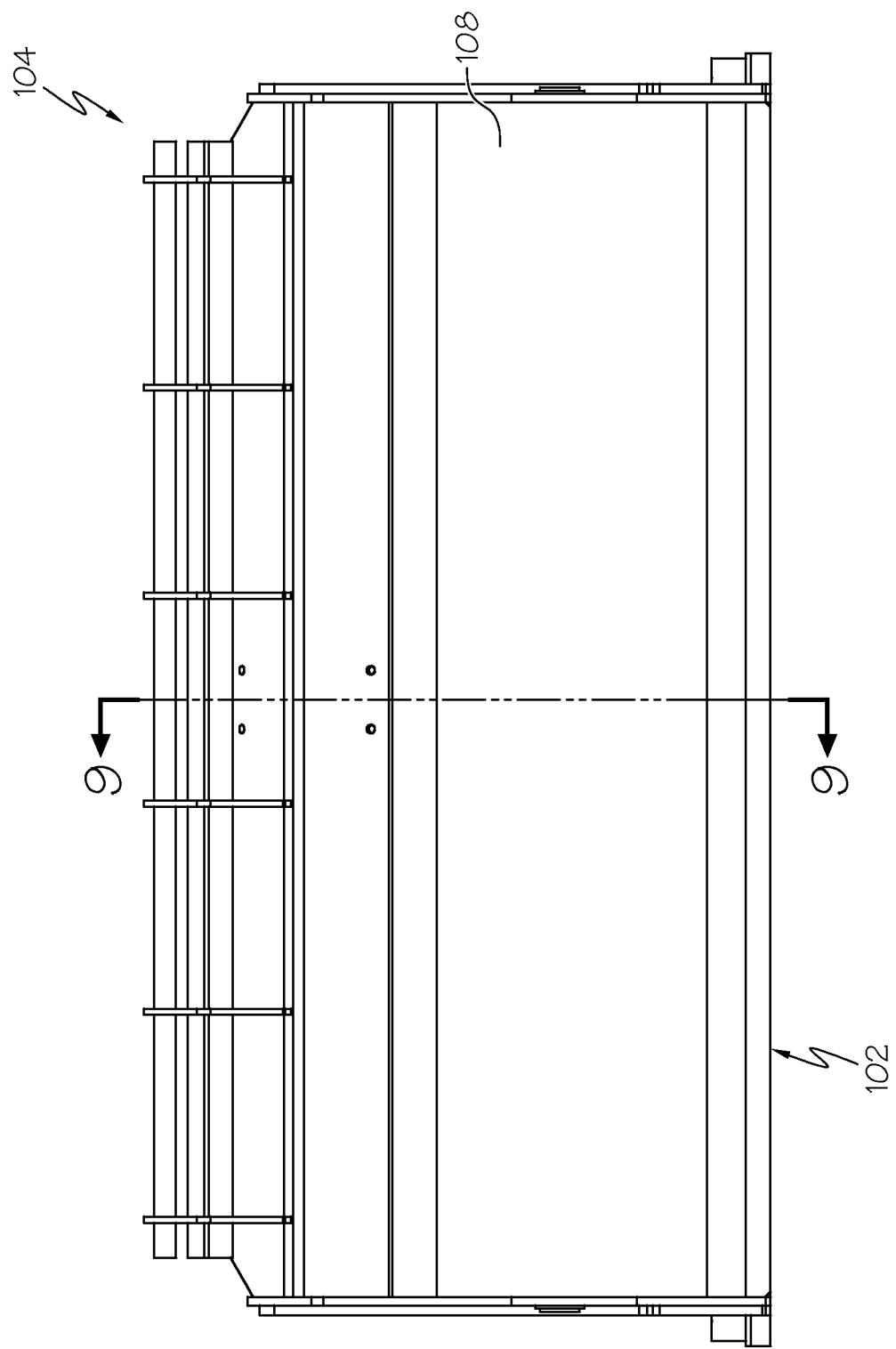
FIG. 7 is a front elevation view of the monolithic floor and hot slag bucket of FIG. 6.

Monolithic floor 102 includes an integral base edge disposed in front of the rectangular floor portion of floor 102. The base edge is provided with a front configured in a desired shape that is typically specified by the end user. As shown in FIG. 6, the integral base edge may be wider than the main body of floor 102. A variety of shapes may be used such as those typically desired on bucket edges. The front edge 110 of floor 102 may be beveled. In the context of this application floor 102 has a substantially uniform thickness even when its front edge is beveled because the large majority of the body of the floor has the uniform thickness. Other than the beveled front edge, base edge and floor portion have substantially the same thickness and are free of welds connecting the two portions together. This integral configuration is achieved by fabricating floor 102 from a single piece of material and cutting away material to form the floor portion having the smaller width.

Figure 9:
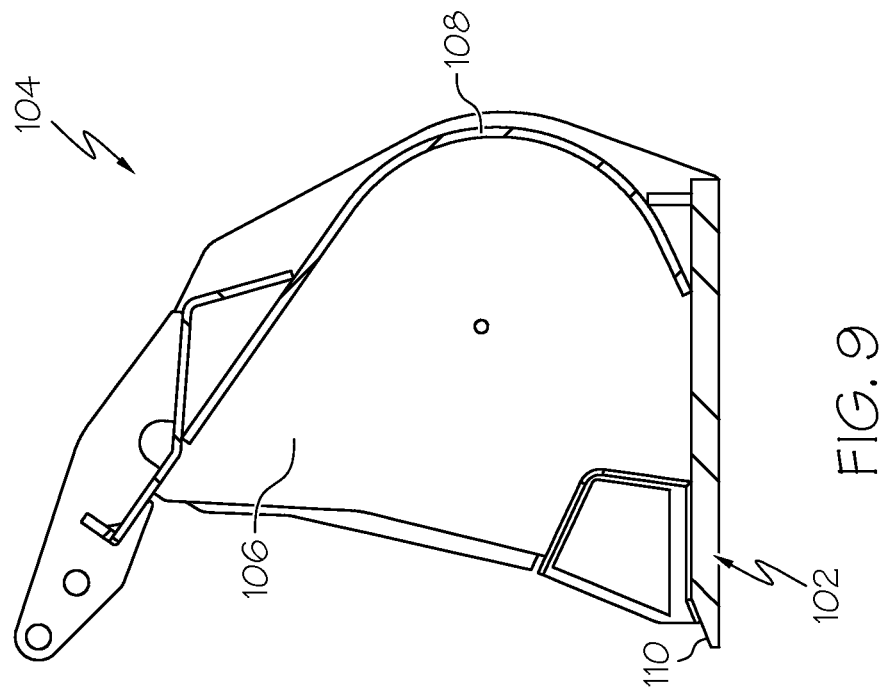
FIG. 9 is a section view taken along line 9-9 of FIG. 7.
Figure 8:
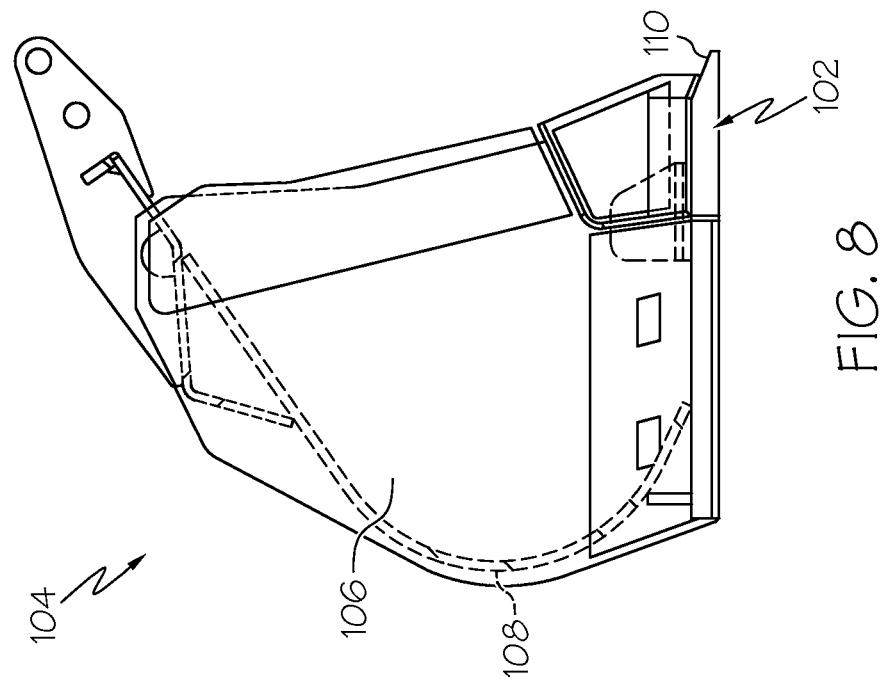
FIG. 8 is a left side view of FIG. 7.

As shown in FIG. 9, spaced skid or wear pads 112 may be welded directly to the bottom of monolithic floor 102 with a tooth assembly 114 attached to the front of monolithic floor 102.

FIG. 10 depicts a weld on edge 116 used with monolithic floor 102. Weld on edge 116 is substantially the same thickness as wear plates 112 and may be welded to the bottom surface of the front of monolithic floor 102 to provide a working edge to bucket 104.

The following is a chart showing what size monolithic floor may be used with a certain bucket size and width. These are non-limiting examples. The size and thickness is determined by what extreme temperatures and site conditions the floors will see. The floors are designed for temperatures above 800 degrees F. Some of the bucket sizes and widths are the same, however the floor thicknesses are determined by the severity of the application. Example, 8×149 has two different thickness floors, they are different based on if the buckets gets teeth or a weld on edge, or is straight or modified.

| BUCKET WIDTH | FLOOR TYPE | EDGE TYPE |
| --- | --- | --- |
| 3 × 108 | MONOLITHIC 1.5" | MODIFIED/WOE |
| 3 × 108 | MONOLITHIC 1.5" | STRAIGHT/W 6 TEETH |
| 3 × 108 | MONOLITHIC 2" | STRAIGHT/W 6 TEETH |

-continued

| BUCKET WIDTH | FLOOR TYPE | EDGE TYPE |
| --- | --- | --- |
| 4.5 × 132 | MONOLITHIC 2" | STRAIGHT/W WOE |
| 5 × 132 | MONOLITHIC 2" | STRAIGHT/W 7 TEETH |
| 5 × 132 | MONOLITHIC 2.5" | STRAIGHT/W 7 TEETH |
| 5 × 132 | MONOLITHIC 2.5" | STRAIGHT/W 7 TEETH |
| 5 × 144 | MONOLITHIC 2" | STRAIGHT/W 8 TEETH |
| 5 × 144 | MONOLITHIC 2" | STRAIGHT/W WOE |
| 5 × 144 | MONOLITHIC 2.5" | STRAIGHT/W 8 TEETH |
| 5 × 144 | MONOLITHIC 2.5" | MODIFIED/W WOE |
| 5.25 × 144 | MONOLITHIC 2.5" | STRAIGHT/W 8 TEETH |
| 5.25 × 144 | MONOLITHIC 2.5" | STRAIGHT/W 7 TEETH |
| 5.25 × 144 | MONOLITHIC 2" | STRAIGHT/W 8 TEETH |
| 5.25 × 144 | MONOLITHIC 2.5" | MODIFIED/W WOE |
| 8 × 149 | MONOLITHIC 2.5" | STRAIGHT/W 8 TEETH |
| 8 × 149 | MONOLITHIC 2.5" | MODIFIED/W 8 TEETH |
| 8 × 149 | MONOLITHIC 2.5" | MODIFIED/W WOE |
| 8 × 149 | MONOLITHIC 3" | MODIFIED/W 8 TEETH |
| 8 × 149 | MONOLITHIC 3" | STRAIGHT/W 8 TEETH |
| 8.25 × 149 | MONOLITHIC 2.5" | MODIFIED/W 8 TEETH |
| 8.25 × 149 | MONOLITHIC 2.5" | MODIFIED/W WOE |
| 8.25 × 149 | MONOLITHIC 3" | MODIFIED/W 8 TEETH |
| 8.25 × 149 | MONOLITHIC 3" | STRAIGHT/W 8 TEETH |
| 8.25 × 149 | MONOLITHIC 3" | MODIFIED/W WOE |
| 11 × 178 | MONOLITHIC 3" | MODIFIED/W 8 TEETH |
| 11 × 178 | MONOLITHIC 3" | MODIFIED/W WOE |
| 11 × 178 | MONOLITHIC 2.5" | STRAIGHT/W 8 TEETH |
| 13 × 195 | MONOLITHIC 2.5" | MODIFIED/W 8 TEETH |

Figure 1:
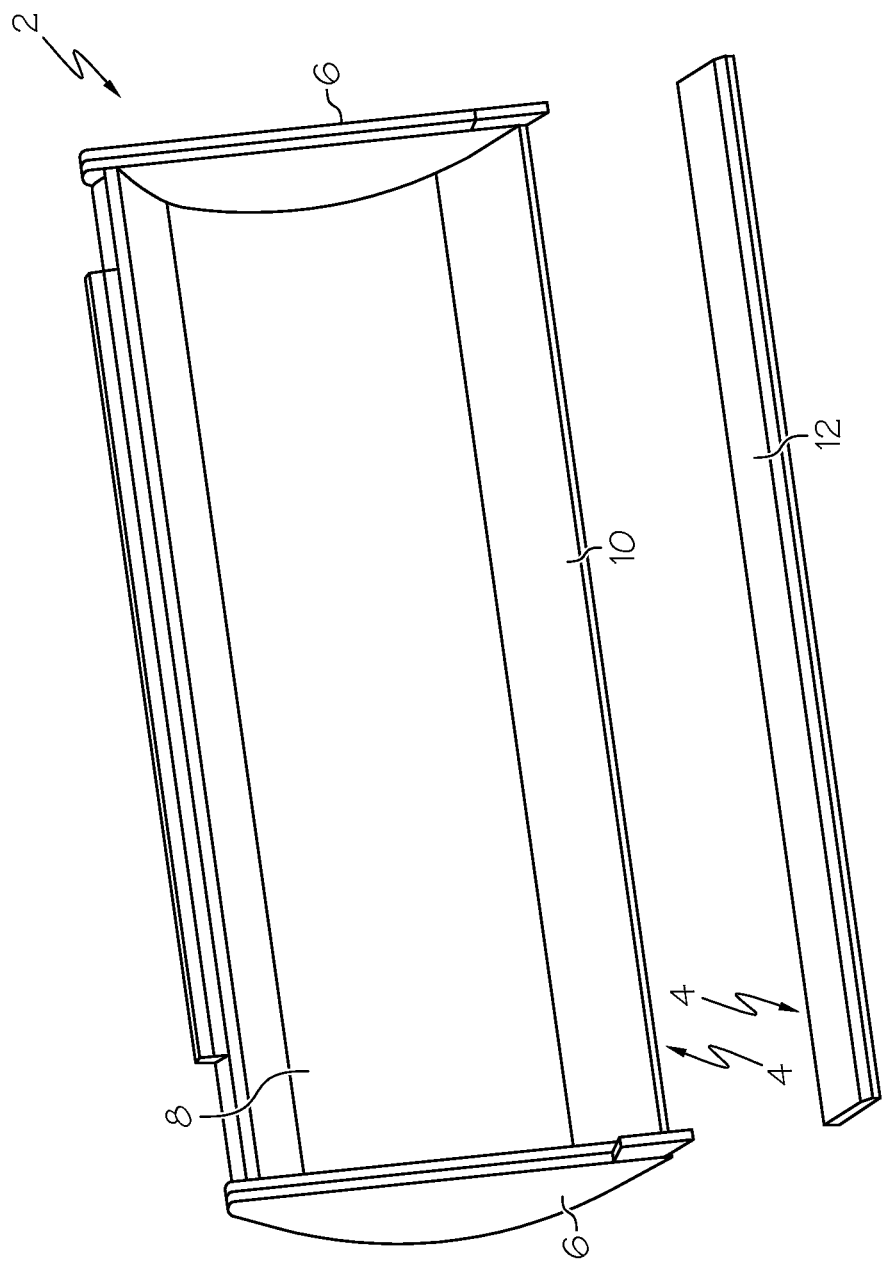
FIG. 1 is an exploded view of a prior art hot slag bucket showing a two-piece floor.
Figure 2:
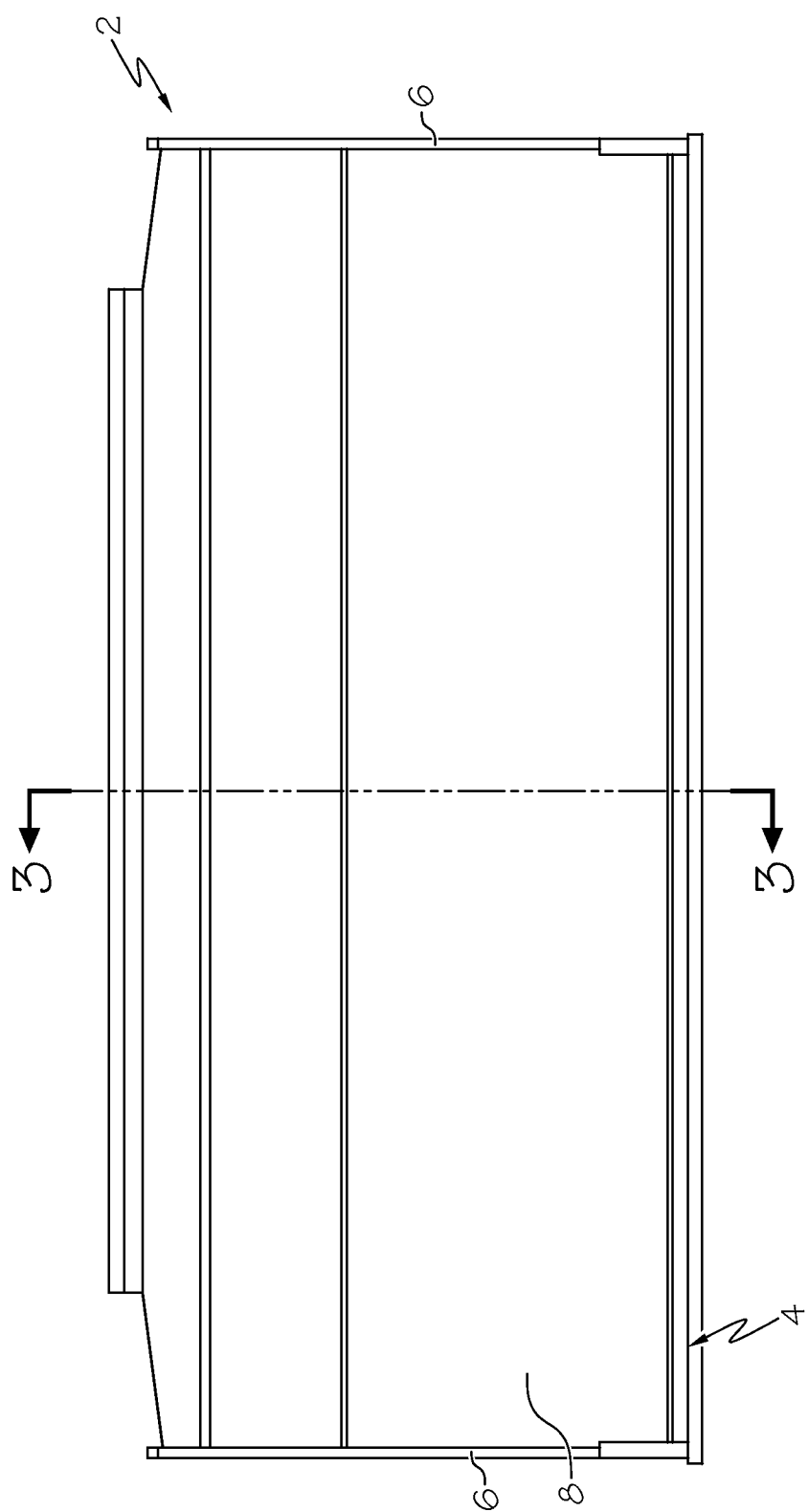
FIG. 2 is a front elevation view of the hot slag bucket of FIG. 1.

Monolithic floor 102 increases the life of bucket 104 compared to bucket 2 when used with hot slag because floor 102 does not warp to the degree as floor 4. Existing buckets such as that depicted in FIG. 1 may be retrofit with floor 102 to obtain the advantages of the invention. When retrofitting a bucket, the bucket to be revised is cut specifically to accept the monolithic floor as a complete assembly. When doing a retrofit bucket using the monolithic floor design on a sloped bottom bucket, the person first removes approximately half of the wrapper and replaces the sloped bottom bucket floor with a flat monolithic floor. So, half of the wrapper is replaced and the entire floor and bottom wear parts are replaced as well. New half side plates are added and hardfaced side protection is added. New tall corner bits and wedges are added to reinforce the corners of the monolithic floor. Internal wear bars are added for protection of the new wrapper and floor. The bucket is literally cut in half and re-built to new. After a visual inspection, the person repairs all visible weld inclusions that are found. Most welds are washed away and need to be fixed or completely re-welded. At least half of the old welds are cut out and replaced. The monolithic design allows for this simplified and significantly less expensive retrofit process as opposed to prior art which is costly and time consuming. In addition, future rebuilds become less costly and time consuming to accomplish because of the simplicity of removal and replacement of the monolithic floor design.

The increased life span and reduced operating costs reduce the overall costs of owning a monolithic floor bucket 104 and the per hour cost of operating monolithic floor bucket 104 are substantially reduced. The increased life span allows the manufacturer or owner of a bucket 104 to lease bucket 104 to the end user because the variable cost of bucket warping is reduced to the owner of bucket 104. In addition, bucket 104 is substantially less costly to rebuild when due for a major rebuild further reducing owning costs for the owner and operating costs for the operator. The monolithic floor thus enables a method of providing hot slag bucket use to the end user wherein the hot slag bucket user leases bucket 104 from a bucket owner who provides the hot slag bucket with monolithic floor 102 configured for the user's particular application. The user places the bucket 104 into service until it reaches a milestone of working hours upon which time the bucket owner replaces the bucket with another and takes the used bucket back for maintenance or a retrofit. This method minimizes the user's downtime and minimizes the user's risk of downtime caused by bucket retrofitting because the bucket owner is responsible for keeping the user supplied with a working bucket.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Throughout the description and claims of this specification the words "comprise" and "include" as well as variations of those words, such as "comprises," "includes," "comprising," and "including" are not intended to exclude additives, components, integers, or steps.

The invention claimed is:

1. A prime mover bucket for use with hot materials such as hot slag; the bucket comprising:
    a monolithic floor defining a front edge, a rear edge, and a pair of spaced side edges;
    the monolithic floor being made from steel;
    the monolithic floor being substantially flat and having a substantially constant thickness of at least one and a half inches;
    the monolithic floor having a base edge and a floor portion; the rear of the base edge having a width that is larger than the width of the front of the floor portion;
    a pair of side plates connected to the monolithic floor at spaced locations; and
    a wrapper connected to the side plates and at least partially disposed above the monolithic floor.

2. The bucket of claim 1, wherein the wrapper is not integral to the monolithic floor.

3. The bucket of claim 2, wherein the monolithic floor is free of welds that connect the base edge to the floor portion.

4. The bucket of claim 3, wherein the monolithic floor has a beveled front edge.

5. The bucket of claim 4, wherein the monolithic floor has a substantially constant thickness of at least two inches.

* * * * *